Feb. 28, 1967  K. E. SHILL  3,307,175
CHARACTER DISPLAY DEVICE AND METHOD OF MAKING SAME
Filed Aug. 31, 1964  3 Sheets-Sheet 1
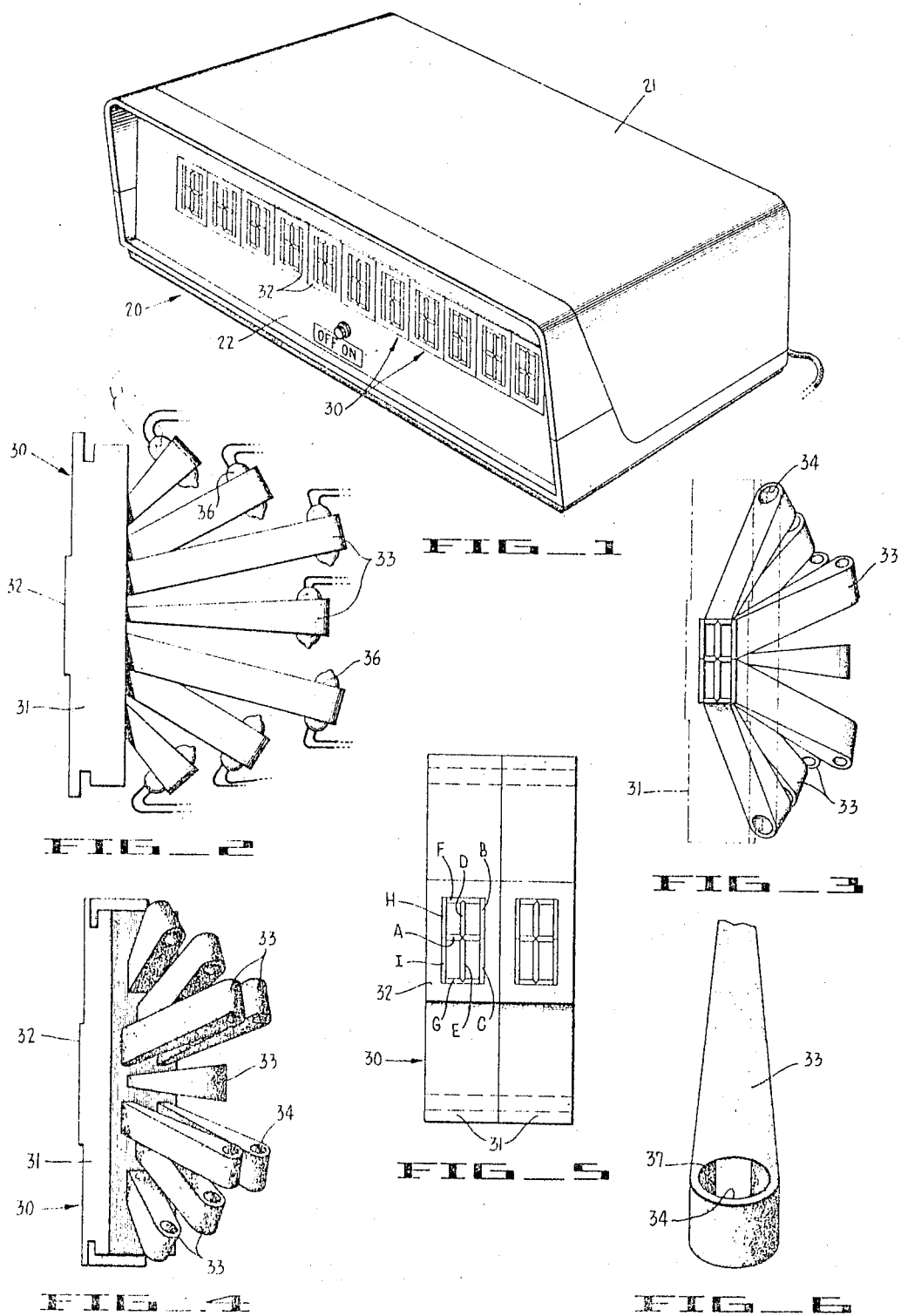

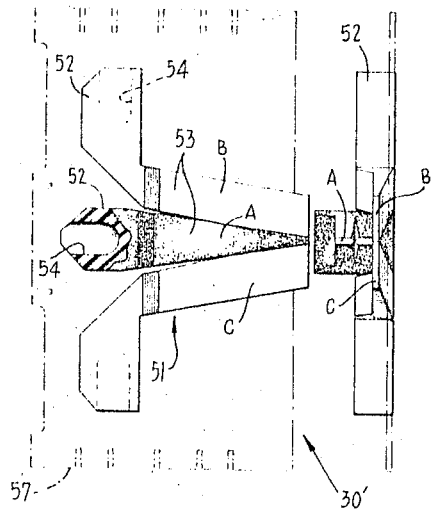
FIG_7
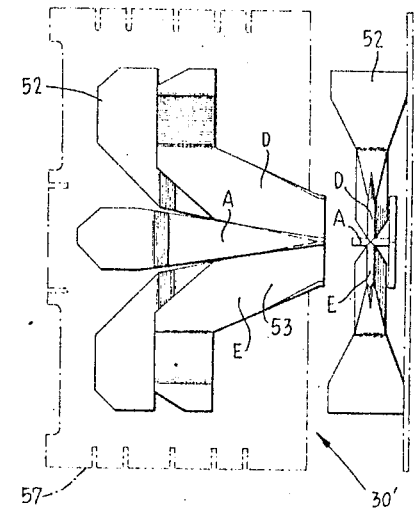
FIG_8
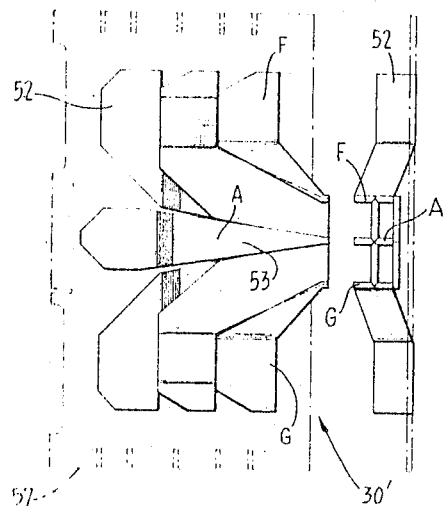
FIG_9
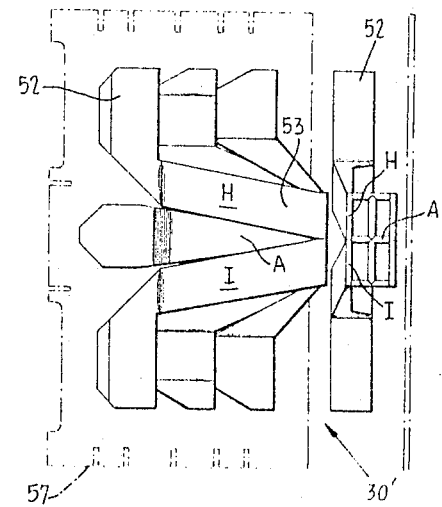
FIG_10

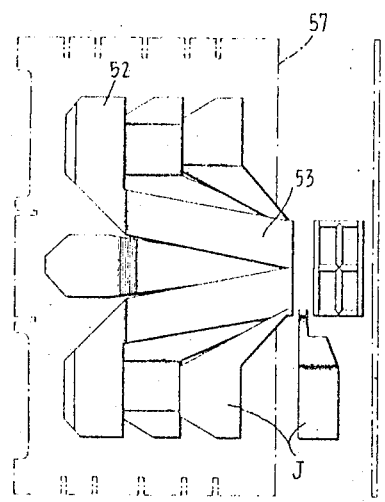
FIG_11
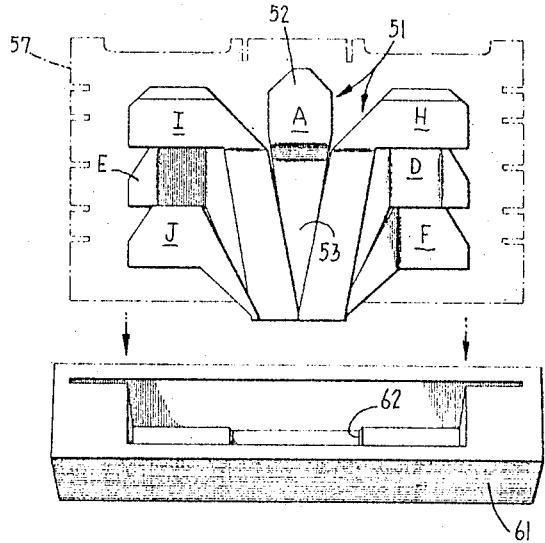
FIG_12
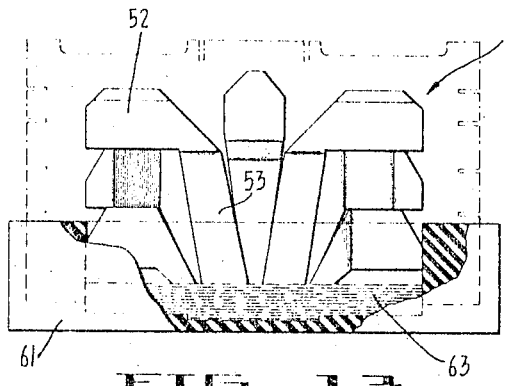
FIG_13
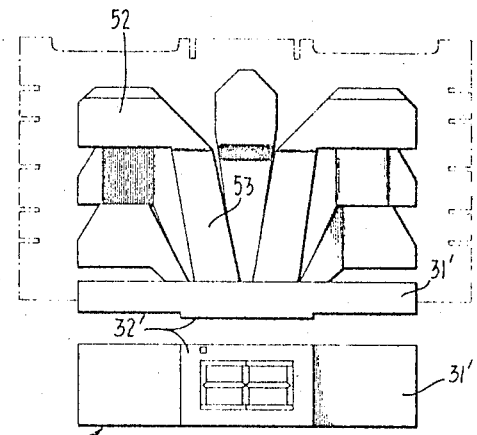
FIG_14
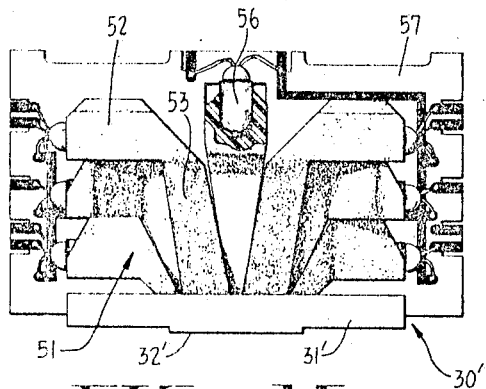
FIG_15
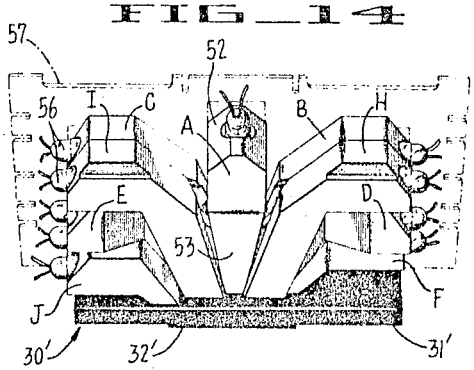
FIG_16

United States Patent Office 3,307,175
Patented Feb. 28, 1967

3,307,175
CHARACTER DISPLAY DEVICE AND METHOD
OF MAKING SAME
Karl E. Shill, Fremont, Calif., assignor to Friden, Inc.,
a corporation of Delaware
Filed Aug. 31, 1964, Ser. No. 393,100
5 Claims. (Cl. 340—380)

This invention relates to an apparatus for displaying a plurality of characters and the method of making character display cells, and more particularly to display cells provided with a plurality of light-transmitting means for illuminating different portions of the display cells.

Heretofore, in known display systems, the individual characters were formed on the viewing screen, or face, by projecting a film image thereon or by placing lamps adjacent the viewing screen in a predetermined pattern and selectively controlling the illumination thereof to produce the desired character. This prior method either involved the use of complex film focusing apparatus or translucent cover plates having masking covers to visibly display the desired character. Those familiar with the art have long recognized the desirability of avoiding such complex and expensive character displays, as noted above, and in providing a compact, inexpensive and simple display device. The present invention eliminates the use of character display tubes, film and focusing lenses, mask cover plates and complex control circuitry.

The present invention provides a novel display cell construction which uses inexpensive light-conducting plastic pipes for transmitting and reflecting rays of light from inexpensive lamps to illuminate rectangular segments of the face portion of the display cell, thereby providing a display of wide viewing angle. In my preferred form, as shown by the embodiment illustrated in the drawings, the display takes the form of the conventional box figure "8" pattern, with a centered "1" bar, which figure is constructed either vertically or at a slight angle, as desired. Preferably, the light-transmitting plastic pipes are coated with a non-transparent material for preventing encroachment of light from one rectangular segment to an adjacent one and for reflecting the maximum amount of light to the face of the display cell. This construction readily provides compact display units having a horizontal center-to-center dimension of approximately five-eighths of an inch (5/8"), or about the same spacing as that found in commercially produced calculating machines and typewriters. At the same time it has drastically reduced the cost of manufacturing and has minimized packaging problems. It is, therefore, an object of the present invention to provide a displaying apparatus for displaying a plurality of different characters.

Another object of the present invention is to provide a novel method of making character display cells.

A further object of the present invention is to provide a compact character display unit including a plurality of display cells, which cells comprise a plurality of light-transmitting and light-bending bars whereby at least eight of said bars are provided with a foot formed at a substantially L-shaped angle of greater than 90° to the leg and one bar formed with its foot and leg straight.

A still further object of the present invention is to provide a method of constructing the novel display cell wherein an inexpensive and simplified molding technique is employed.

Still another object of the present invention is to provide uniform light intensity throughout the character display face of the display cell. In accordance with the preferred form of the present invention the illuminating ends of the light-transmitting bars are molded in an opaque material so that only the face of the rectangular illuminated segments are visible while the body portion of the bars are mounted on a printed circuit board in such an arrangement as to form a double figure "8" configuration and each bar is coated with a nontransparent light-reflecting material for preventing light enroachment from one bar to another and for obtaining the maximum amount of light at the face of the display cell.

Other objects of the present invention will, in part, be obvious and will, in part, appear hereinafter.

The present invention accordingly comprises the several steps and the relation of one or more of such steps with respect to each of the others, and the apparatus embodying the features of construction, combinations of elements and arrangement of parts which are adapted to effect such steps, all as exemplified in the following detailed disclosure, and the scope of the present invention will be indicated in the claims.

For a fuller understanding of the nature and objects of the invention, reference should be had to the following detailed description, taken in connection with the accompanying drawings, in which:

FIG. 1 is a pictorial view of the character display unit embodying the present invention;

FIG. 2 is an elevational view of one embodiment of the present invention and shows one arrangement of the light-conducting pipes employed in illuminating the face of the display cells;

FIG. 3 is a front perspective view of the display cell shown in FIG. 2, and particularly shows the arrangement of the rectangular light-emitting ends of the light-conducting pipes;

FIG. 4 is a rear perspective view of the display cell shown in FIG. 2;

FIG. 5 is a front elevational view of two of the display cells shown in FIG. 2 and shows particularly their face portion wherein the rectangular light-emitting ends of the light-transmitting bars take the form of a box figure "8" with a centered "1";

FIG. 6 is a detailed pictorial view of one of the light-transmitting bars shown in FIG. 2 and shows the wedge shape these particular bars must take in order to provide its narrow rectangular face;

FIGS. 7 through 11, inclusive, are elevational views showing the steps taken in constructing a display cell of another embodiment of the present invention;

FIG. 12 shows the light-transmitting bars as they would appear after being mounted on an insulated circuit card and prior to being placed in a mold for forming the face portion of the display cell;

FIG. 13 shows the card mounted light-transmitting bars in the mold partially filled with a monolithic potting material;

FIG. 14 shows the display cell after it has been removed from the mold and the monolithic material hardened to form the face of the display cell; and FIGS. 15 and 16 show the finished display cell of the second embodiment of the present invention and show the lamps inserted into appropriate apertures provided in the ends of the display bars and connected to circuit-conducting paths of the printed circuit card.

As an aid to understanding this invention, it may be indicated in summary form that the display cell of the instant invention employes the use of either a minimum of seven (for the conventional box "8" configuration) or a maximum of ten (for the box "8" with a centered "1" and a decimal point) light-transmitting bars for visually displaying a plurality of different characters. The cells are manufactured either by placing the light-transmitting bars in a mold containing a monolithic material and supporting them therein until the material hardens, or by first mounting the bars on a printed circuit card and then placing the card-mounted bars in a mold of monolithic material until the material is hardened, followed by finishing the face portion of the display cell to expose the ends of the light-transmitting bars. In either event, the bars are preferably first coated with a nontransparent light-reflecting material for preventing encroachment of light from bar to another and for obtaining the maximum amount of illumination at the face of the display cell. The cells are subsequently secured within the housing of the display unit and the lamps are then connected to the appropriate control circuitry provided in the housing so that predetermined ones of the lamps may be energized to form a visible displayed character.

The actual details of this invention are best described by referring to the accompanying drawings showing the display cell and the method of making it.

The display 20 (FIG. 1) of the present invention is shown mounted within a housing 21 wherein the selective control circuitry for illuminating predetermined portions of the display face is also contained. The display 20 is provided with a front partition, or wall, 22 having an elongated opening therein in which the face portion of a plurality of display cells is ordinally mounted. The selective control circuitry within the housing 21 may be controlled from some external device, such as the electric readout from a calculator or computing machine. As seen in FIG. 1, the display 20 of the present invention provides a plurality of ordinally arranged display cells 30 mounted adjacent each other on or about five-eighths of an inch (5/8") centers. The visual character display cell of the present invention is formed of any suitable opaque material, such as metal or plastic and is of a suitable size so that the character indications can be easily observed from a distance. In the preferred form of the present invention I prefer to provide a visual display face having an area of about five-eighths of an inch (5/8") wide and one inch (1") high on which a character of about five-sixteenths of an inch (5/16") wide by three-eighths of and inch (3/8") wide by five-eighths of an inch (5/8") high is visibly displayed.

Referring now to FIGS. 2 to 5, inclusive, the display cell 30 of one form of the present invention includes a face member 31 formed from any suitable opaque material, such as a low melting point potting metal or a monolithic plastic. A display face 32 slightly protrudes from the front side of the face member 31 and is of such a size as to accomplish the dimensions mentioned hereinabove, so that the display cells can be easily accommodated in the elongated opening provided in the front wall 22 of the display unit 20. The face member 31 supports light-transmitting members for piping light to the face 32, as will be described hereinafter.

As seen in FIGS. 2, 3 and 4 a plurality of straight wedge-shaped light-conducting pipes, or bars, 33, constructed from any suitable materials having "light piping" properties, such as Lucite or Plexiglas, are molded in the face portion 31 of the display cell 30. In molding the pipes 33 within the face 31, the pipes are arranged so that their individual rectangular ends form a figure "8" configuration as shown, for example, in FIG. 5. The viewing end of each of the light-conducting pipes 33 is formed into a narrow rectangular bar which, when the light-conducting pipes are illuminated, sharply defines edges which serve as segments from which digits "0" through "9" are selectively formed.

The larger end of each wedge-shaped light-conducting bar, or pipe, 33 is provided with an aperture 34 for receiving a light source, such as neon bulb 36 (FIG. 2), which bulbs are connected by suitable wires to the selective control circuit provided within the housing 21 of the display 20.

It can be mentioned at this point that in order to concentrate the maximum amount of light at the face 32 of the display cell 31, each wedge-shaped light-transmitting bar 33 is preferably coated with a nontransparent, light-reflecting material, such as aluminum, silver, or white paint. Another reason for coating the wedge-shaped light conductors 33 is to prevent encroachment, or spillover, of light from one bar to an adjacent bar, whereby the light visible at the rectangular ends of the bars has sharply defined edges for providing clear and distinct characters. Furthermore, a reflective sleeve 37 (see FIG. 6) having an opening or slot therein may be inserted within the aperture 34 of the wedge-shaped plastic pipes 33 for reflecting most of the light emitted by the bulb 36 down the barrel, or trough, of the plastic light-transition pipes 33.

In the embodiment of the invention shown in FIGS. 2 through 6, I prefer to use nine light-conducting bars 33 to form the modified figure "8" configuration, as shown in FIG. 5. However, a lesser number of bars could be used, such as seven, but at the sacrifice of the central "1."

In constructing the display cells 30 shown in FIG. 5, three of the light-conducting bars 33 are mounted so that the longer dimensions of their narrow rectangular light-emitting ends are disposed in substantially horizontal parallel relationship with one another, with one of the three bars being at the top of the character-indicating area, the second of the three bars being at the center, and the third of the three bars being at the bottom of the character-indicating area. The remaining six of the light-conducting bars, or pipes, 33 are mounted so that the longer dimension of their narrow rectangular light-emitting ends is approximately perpendicular to the three horizontally disposed bars, and a first pair of the six light-conducting pipes are disposed in vertical alignment with one another and at the left side of the character-indicating area. The second pair of the six light-conducting pipes have their rectangular ends in alignment with one another at about the center of the character-indicating area, and the remaining pair of the six light-conducting pipes are also in alignment with one another and at the right side of the character-indicating area. Therefore, it can be seen that the light-conducting pipes 33 are molded within the face portion 31 of the character display cell 30 so that their rectangular ends form a figure "8" pattern with a line or bar centrally vertically disposed within the indicating area.

In making the display cell 30 according to the teachings of the above-described wedge-shaped embodiment, the light-conducting pipes 33 are first fabricated into the shapes shown in FIGS. 2 to 6 and the aperture 34 is drilled in the larger end of the wedge-shaped conductor. Polishing the light-conducting pipes to a high luster is the step next taken in making the display cell 30. A very fine film abrasive, such as zinc oxide (ZnO), laminae alumina (AL203), or other suitable abrasives, is used in connection with a buffing wheel, or polishing cloth, for polishing the surface of the pipes as well as the aperture 34. The reflective sleeve 37 is then mounted in the aperture 34 with its slot facing toward the rectangular light-emitting end of the pipe. Coating the pipes with a suitable opaque material for preventing escapement of light from one conductor to another conductor follows the polishing operation in preparing the display cell. A coating, such as silver, which, not only prevents light-escapement but also reflects light, may be used and is applied either by evaporating, electroplating, or spattering methods. The pipes are now placed in a mold, similar to the mold shown in FIG. 12, which has been previously partially filled with an opaque monolithic face material, such as plastic or a low-melting point metal. The monolithic material used for each display cell has a volume from about 6 cc. to about 9 cc. The pipes are arranged in the mold so as to form the configuration shown in FIGS. 2 and 5 and remain therein until the monolithic material hardens. After the display cell is removed from the mold, the offset face portion 32 thereof is finished, such as by grinding or buffing, to remove any excessive molding material from the face 32 and to expose the rectangular light-emitting ends of the light-conducting pipes 33.

A second embodiment of a display cell of the present invention, and the method of making it, is shown in FIGS. 7 through 16. In this embodiment the display cell comprises a plurality of odd-shaped light-conducting, or transmitting, bars mounted on an insulating board in overlapping juxtaposition to form an extremely compact display cell (see FIGS. 15 and 16).

In the second embodiment shown in FIGS. 7 through 16, the display cell 30' includes a plurality of light-conducting pipes, or bars, 51 having an enlarged light-receiving portion, or foot, 52, and a leg, or light-conducting portion, 53. Each of the legs 53 is relatively thin and tapers to a narrow rectangular light-emitting face, as shown in these figures, while the foot portion is relatively thick to encompass a suitable lamp. The foot portion 52 of all of the light-conducting bars 51, except the bar forming the central horizontal portion of the figure "8" configuration (hereinafter designated bar A), is joined to the leg, or light-conducting portion, 53 by an angle somewhat greater than 90°, and hence the two portions form what may loosely be referred to as "L-shaped" light-conducting bars. The central horizontal bar A is substantially straight (similar to the light bars of the first embodiment), but the foot is much deeper than the leg portion, and thus forms a similar angle with the leg, but in a plane perpendicular to the card on which it is mounted instead of in the planes parallel to such card.

As mentioned above the joining of the tapered leg portion 53 with the foot portion 52 forms an obtuse angle. As shown, for example, in FIGS. 15 and 16 the angle formed by joining a line drawn through the axis of the foot and leg of the light-conducting bars, forms an angle from about 105° to about 129°. The outside corner of the junction of the leg and foot portions, as already mentioned, is cut at an angle to provide a reflective angular surface, which angular surface is from about 45° to about 63° to the axis of the foot portion 52. Put another way, the bar forming the central horizontal segment (FIG. 7) of the figure "$\mathcal{B}$" configuration is relatively straight whereas the four bars forming the left and right vertical segments of the figure "$\mathcal{B}$" configuration (FIGS. 7 and 10) have the axis of their tapered legs 53 at an angle of about 105° to the axis of the rectangular foot 52, while the two light-conducting bars forming the central vertical legs have the axis of their legs at an angle of about 109° to the axis of their foot portion, and the two other horizontal bars forming the top and bottom of the figure "$\mathcal{B}$" configuration have the axis of their leg portion at an angle of about 126° to the axis of their foot portion. As described in detail herein, a decimal point light-conducting bar may be added to the display device of the present invention, in which case the axis of its leg portion would form an angle of about 129° with the axis of its foot portion.

The foot portion 52 of each light-conducting bar 51 has a bore 54 substantially parallel to the longer dimension of the base 52 and at a substantial angle to the leg portion 53. As shown in FIG. 15 a small neon, or other suitable lamp, 56 is placed within the bore 54 for illuminating the light face, as will be more fully described hereinafter. The bore 54 is deep enough so that substantially the entire lamp, or bulb, 56 is surrounded by the walls of the bore in order that the maximum amount of light is transmitted to the face of the bars.

As seen in FIGS. 7 through 16, the foot portion 52 of each L-shaped light-conducting bar 51 has its outside corners cut at an angle of approximately 45° to the axis of the bore 54. These angular corners may vary slightly between the various members and are so designed as to reflect a maximum amount of light axially down the leg, or bar, to the face of the bar. It has been found that such an angular corner acts as a mirror and results in a more brilliant display than would occur in round bends or sharp right angle corners. It can be mentioned at this point that each bar 51 is preferably coated with a nontransparent light-reflective material so that the light rays emitted by the lamp 56 are reflected by the walls of the base portion 52 and piped through the leg portion 53 to the rectangular face of the bar. In other words, a ray of light is reflected back and forth in the base portion 52 until it is reflected through the leg portion 53 to the visible face of the bar. It is important to note that best light piping is secured when sharp angles, or bends, in plastic are avoided. Therefore, the leg portion 53 of the light bar 51 is at an angle greater than 90° to the foot portion 52, so that the rays of light emitted by the bulb 56 are easily reflected axially through the plastic transmitting bar. Furthermore, the coating of the bar with a nontransparent light-reflecting material, such as silver or aluminum, helps to reflect the light rays through the leg portion 53 to the visible light-emitting end of each bar.

The method of constructing the display cell 30' in accordance with the teachings of the above-described sound embodiment is shown in FIGS. 7 through 11. The light bars 51 can be formed by either casting in a high polished mold or by the more laborious method of cutting the bars out of bar stock and thereafter polishing the bars to a high luster. In either method adapted for constructing the bars, it is desirable (for best results in piping light) that the bars have a highly polished surface before they are coated. The bars are then coated with an opaque, and preferably a reflective, material for preventing light escapement and increasing brilliancy at the light-emitting end of the bars. Next, bore 54 is drilled in the base 52 and polished. As seen in these figures, bars 51 are shaped in such a manner so that they can be mounted on a printed circuit card 57 in close and overlapping relationship to each other, whereby their light-emitting rectangular ends form a figure "8" configuration with a central vertical bar passing therethrough ($\mathcal{B}$). Also a decimal point light-transmitting bar can be mounted on the card 57 so that its light-emitting end lies to the left of the figure "8" configuration when it is desired to display decimal fractions in the display unit 20.

Hereinafter, for convenience in understanding the method in which the display cell 30' is fabricated, alphabetic letters "A" to "J" will be used to indicate the several light-transmitting bars 51.

With continued reference to the drawings and beginning with FIG. 7, the steps followed in constructing the display cell associated with the second embodiment of the present invention will now be described in detail. The bar A (FIG. 7) forming the central horizontal light emitter of the figure "8" configuration is first mounted on the printed circuit card 57 so that its light-emitting end is slightly beyond the edge of the card. Next, the bars forming the right top vertical and the right bottom vertical light emitters B and C, respectively, are mounted on the printed circuit card 57 so that their narrow rectangular ends are in alignment with one another. The three bars A, B and C are mounted on the printed circuit card 57 with the ends of their rectangular light-emitting faces abutting each other.

As seen in FIG. 8, the bars forming the top central vertical and bottom central vertical light emitters D and E, respectively, are next mounted on the printed circuit card 57. These bars are mounted on the card 57 with their rectangular light-emitting faces bisecting the central horizontal bar A. As seen in FIGS. 7 and 8, the central horizontal bar A is notched at its middle to receive the corresponding pointed ends of the top and bottom central vertical bars D and E. Therefore, it can be seen that if the bars D and E are illuminated simultaneously they will appear as one continuous bar instead of two individual bars.

In FIG. 9, the bars F and G forming the top horizontal and bottom horizontal light emitters, respectively, of the figure "8" configuration, are shown as being the ones next mounted on the printed circuit card 57. Bar F is mounted on the printed circuit card so that the uppermost edge of its rectangular light-emitting face is in alignment with the topmost edge of the right top vertical bar B and that a notch therein mates with the corresponding pointed end of the top central vertical bar D. Similarly, the bar G is mounted on the card 57 so that the lowermost edge of its light-emitting face is in alignment with the lower edge of the right bottom vertical bar C, and that a notch therein mates with the corresponding pointed end of the bottom central vertical bar E. It is interesting to note, in viewing FIG. 9, that the rectangular light-emitting faces of the bars A through G now appear to form the letter "B." In fact, if these bars were now illuminated, the letter "B" would appear on the face portion 32 of the display cell 30' of the display 20 (see FIG. 1). If the bars B through G were illuminated, and bar A was not, then the letter "D" would appear on the display 20. Likewise if the bars F, B, A, C and G were illuminated, the numeral "3" would be displayed.

It will be seen by reference to FIG. 10 that the light-transmitting bars forming the left top vertical bar and left bottom vertical light emitters H and I, respectively, are next mounted on the printed circuit card 57. However, this time these bars are not directly mounted on the printed circuit card as have been the previous bars, but are mounted directly on bars B and C. That is, the foot portion 52 of bars D and H are secured together, as are bars E and I, but their respective leg portions 53 diverge, so that bars H and I form the left edge of the figure "8" configuration. As seen in FIG. 10, bars H and I are mounted in a common plane, and the light-emitting face of bars H and I contact the ends of the three bars F, A and G.

A feature of the present invention not heretofore mentioned, but which would, in some cases, be desirable to incorporate into the present invention in order to improve readability of the displayed character, is to slant the vertical members B, C, D, E, H and I to the right, and to offset the horizontal members A and F progressively to the right with respect to the bottom segment G. In this case, the vertical light-emitting segments make an angle of about 80° with the horizontal segments, or character bars. Therefore, a preferred character slope of about 10° from the vertical is achieved. In this situation, vertical light pipes, or bars, 51 are mounted at a slight angle to the card on which they are affixed, and the offset face portion 32' of the face is slanted at a corresponding angle to the face 31', so that the respective cells can be arranged in the usual horizontal manner on the base of the display unit 20. Characters illuminated on the offset face 32' of the display cell 30' would now appear at a slight slant from the vertical, as is normally done when writing or printing characters by hand.

A light-transmitting bar forming the decimal point light-emitting segment J (FIG. 11), is shown as being the last bar mounted on the printed circuit card 57. This bar J is mounted on top of the bar G and forms the decimal point for fractional digital displays. The decimal point bar J has its light-emitting face in horizontal alignment with the bar G and slightly to the left thereof. It should be noted that the light-transmitting bars 51 are mounted on the printed circuit card 57 with their light-emitting faces, or segments, extending slightly beyond the edge of the card, so that the distal portion of the legs 53 can be cast in a monolithic material, as will be hereinafter described. It can also be noted at this time, that the light-transmitting bars 51 are mounted on the printed circuit card 57 and to each other by any suitable bonding agent, such as by quick-drying shellac or glue.

The cell assembly of printed circuit card 57 and the light-transmitting rods 51 mounted thereon is now ready to be placed in a mold 61, as shown in FIG. 12. The mold 61 is shaped so as to tightly receive the printed circuit card 57. It will also be seen in FIG. 12 that the bottom interior of the mold 61 is provided with an offset portion 62 to facilitate in forming the face 32' of the display cell 30'. Preferably, before the cell is placed in the mold 61, the mold is partially filled with from about 6 cc. to 9 cc. of a monolithic potting material (see FIG. 13). Such potting material can be a liquid opaque plastic or a low-melting point metal. After the mold has been partially filled with the monolithic material the rectangular light-emitting face portion of the light-transmitting rods 51 (in other words, the end portion of the light-transmitting unit) is immersed into the potting material 63 and left there until hardening of the potting material 63 has occurred. After the material has hardened, the display cell 30' is removed from the mold 61 and the face portion 32' is shaved to remove any monolithic material that may cover the rectangular end portions of the light-emitting bars 51 and to provide a perfectly flat light-emitting face. Again it is to be noted that the face portion 32' is slightly offset from the rest of the base portion 31' in order to facilitate mounting the display cell 30' in the display unit 20.

After the face of the display cell 30' has been finished, lamps 56 (FIG. 15) are inserted into the bore 54 provided in the foot 52 of the respective light-conducting rods 51. The leads from the lamps 56 are then soldered to the different electrical conducting paths provided on the printed circuit card 57. The display cell 30' is now ready to be mounted in the display unit 20 and connected to the selective control means provided therein. The selective control circuit provided within the housing 21 is so chosen that predetermined ones of the light-conducting rods 51 may be illuminated to display a plurality of different characters.

Operation of the present invention will be described with continued reference to FIG. 5 for explaining how a plurality of different characters may be visually displayed on the display unit 20.

As mentioned hereinabove, the selective control circuit is contained within the housing 21 and energized from a readout matrix of, for example, an electronic calculator. Visual character display is effected by operation of the selective control circuit to cause predetermined ones of the lamps 56 to glow. Because the light emitted by the lamps is transmitted through the light bars 51, the narrow rectangular ends of the bars will be illuminated to display the selected character on the face 32 of the display cell 30 (or, in the second embodiment, the face 32' of the display cell 30'). In order to display the number "1," for example, the light-conducting bars, or rods, D and E (FIG. 5) are illuminated. To display a number "2" the light-conducting bars F, B, A, I and G are illuminated. For a number "3" the light-conducting bars F, B, A, C and G are illuminated. For a number "4" the light-conducting rods H, A, B, and C are illuminated. For a number "5" the light-conducting rods F, H, A, C and G are illuminated. For a number "6" the light-conducting rods F, H, I, G, C and A are illuminated. For a number "7" the light-conducting rods F, B and C are illuminated. For a number "8" all of the light-conducting bars are illuminated except bars D and E. For a number "9" the light-conducting bars A, H, F, B, C and G are illuminated. For a "0" the light-conducting rods F, H, I, G, C and B are illuminated. At any time when it is desired to display a decimal point the light-conducting bar J (FIG. 11) may be illuminated.

Provisions are also made for displaying other than numerical characters, such as, for example, a plus sign (+) and a minus sign (—). Display of the plus sign is achieved by illuminating the light-conducting rods D, E, and A, while the minus sign is displayed by illuminating the light-conducting rod A.

Many alphabetic characters may be displayed in the preferred form of the present invention, several of which will be mentioned hereinafter. For example, the letter "H" may be displayed by illuminating the light-conducting rods H, I, A, B and C. As mentioned earlier, the letter "B" is displayed by illuminating the light-conducting rods F, E, C, G, A, D and E. The letter "E" is displayed by illuminating the light-conducting rods F, H, A, I and E. The letter "G" is displayed by illuminating the light-conducting rods F, H, I, G and C. The letter "Y" is displayed by illuminating the light-conducting rods H, A, B and E. And the letter "P" is displayed by illuminating the light-conducting rods H, I, F, B and A. From the foregoing, it will be evident that many different combinations of letters and numbers may be displayed on display unit 20 by energizing predetermined ones of the lamps 56 to illuminate one or more of the several light conducting rods 51.

It will be appreciated from the foregoing description of the present invention that a compact display can be provided for displaying a plurality of different numbers and letters and that the ordinal spacing between such letters or numbers does not have to be any greater than that provided in an ordinary calculating machine. As hereinbefore mentioned, the display of the present invention has proven its smallness in size and low cost in manufacturing. The unit will also display slanted, as well as vertical, numbers "0" through "9" with centered "1's," decimal points, plus (+) and minus (—) signs, and many letters of the alphabet. The novel method of making the display cells of the present invention has gone a long way in achieving a low cost display while at the same time maintaining very bright display segments.

It will thus be seen that the objects set forth above, among those made apparent from the preceding description, are effectively obtained. Since certain changes may be made in carrying out the above methods and in the constructions set forth without departing from the scope of the invention, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A display device for visually displaying alphanumeric characters comprising:
    a printed circuit card;
    a plurality of plastic light-conducting bars mounted on said card in a predetermined pattern to form a figure "𝐵" configuration, including one straight light-conducting bar mounted on said card to form the central horizontal segment of said predetermined figure "𝐵" configuration, four of said bars having a tapered leg portion the axis of which is formed at an angle of about 105° to the axis of an enlarged substantially rectangular foot portion and mounted on said card to form respectively the upper and lower left and right vertical segments of said figure "𝐵" configuration, two of said light-conducting bars having a tapered leg portion the axis of which is formed at an angle of about 109° to the axis of an enlarged substantially rectangular foot portion and mounted on said printed circuit card to form the central vertical segments of said figure "𝐵" configuration, and another two of said light-conducting bars having a tapered leg portion the axis of which is formed at an angle of about 126° to the axis of an enlarged substantially rectangular foot portion and mounted on said printed circuit card to form the top and bottom horizontal segments of said figure "𝐵" configuration.

2. The display device as recited in claim 1 in which said plurality of plastic light-conducting bars includes yet another one of said light-conducting bars having a tapered leg portion terminating in a small rectangular segment to constitute a decimal point for the alphanumeric character display device where the leg portion has its axis formed at an angle of about 129° to the axis of an enlarged substantially rectangular foot portion which is mounted on said printed circuit card.

3. A display device for producing a visual indication of the digits "0" through "9" comprising:
    a face member of opaque monolithic material having a digital indicating area;
    a printed circuit card having one edge molded in said monolithic face member;
    a plurality of at least nine light-conducting bars positioned on said printed circuit card, each of said bars having an elongated tapered leg portion, one end of which terminates in a narrow rectangular light-emitting segment disposed at the digital indicating area in a particular pattern for visually indicating a plurality of digits thereon, and the other end which forms a large substantially rectangular light-receiving foot with the junction of the leg and foot providing an outer angular face constituting an angle of light reflection between the axis of the foot and the axis of the tapered leg;
    eight of said bars having its foot formed at an angle of greater than 90° to the leg and one of said bars formed substantially straight, said straight bar having its foot mounted on said printed circuit card to provide the central horizontal segment of a figure "𝐵" configuration, six of said L-shaped bars having their feet mounted on said printed circuit card to provide the right vertical segment, the top and bottom horizontal segments, and the central vertical segment of the figure "𝐵" configuration, two of said L-shaped bars having their feet mounted on the feet of other L-shaped bars to provide the left vertical segments of the figure "𝐵" configuration;
    lighting means for each of said light-conducting bars and connected to different circuit paths on said printed circuit card for selectively illuminating predetermined ones of said light-emitting segments to visually produce the digits "0" through "9" on the digital indicating indicating area; and
    each foot of each of said light-conducting bars provided with a bore axially parallel thereto for receiving said lighting means whereby the rays from said lighting means are reflected by said angle of reflection from said foot through said tapered leg to the light-emitting segment thereof.

4. The display device as recited in claim 3, further comprising:
    a coating means on each of said light-conducting bars for preventing encroachment of light from one bar to another and for intensifying the amount of light emitted from the light-emitting segment thereof.

5. A display device comprising:
    a plurality of segment display bars constructed from a high light-transmitting and reflecting material with each bar having an elongated tapered leg, one end of which terminates in a narrow rectangular light-emitting segment and the other end forming a rectangular light-receiving foot having an axial bore therein for receiving a small electric lamp;
    one of said display bars is formed with the leg and foot substantially straight and positioned so that its narrow rectangular segment forms the central horizontal segment (—) of a predetermined configuration;
    a first pair of said bars bars having the axis of the leg formed at an angle of about 105° to the axis of the foot and positioned so that their narrow light-emitting segment forms one of the upper and lower verti-

11 cal segments (–/) of the predetermined configuration;

a second pair of said bars having the axis of the leg formed at an angle of about 109° to the aixs of the foot and nestled within the angle of said first pair of bars so that their narrow light-emitting segments form the upper and lower central vertical segments (–/–/) of the predetermined configuration;

a third pair of said bars having the axis of the leg formed at an angle of about 126° to the axis of the foot and nestled within the angle of said second pair of bars so that their narrow light-emitting segments form the top and bottom horizontal segments ( ⌐⌐ ) of the predetermined configuration;

a fourth pair of said bars having the axis of the leg formed at an angle of about 105° to the axis of the foot and having their feet abutting the feet of the first pair of said bars so that their narrow light-emitting segments form the other one of the upper

12 and lower vertical segments ( 8 ) of the predetermined configuration; and a monolithic and relatively thin face member of opaque material molded about said terminal narrow rectangular light-emitting segments for supporting each of said segment display bars in the predetermined configuration ( 8 ).

References Cited by the Examiner

UNITED STATES PATENTS

| 2,589,569 | 3/1952 | Peter | 340—380 |
| 3,174,144 | 3/1965 | O'Neill | 340—336 X |

FOREIGN PATENTS 212,955  4/1941  Switzerland.

NEIL C. READ, *Primary Examiner.*

R. M. GOLDMAN, A. J. KASPER,
*Assistant Examiner.*

UNITED STATES PATENT OFFICE
CERTIFICATE OF CORRECTION

Patent No. 3,307,175                  February 28, 1967

Karl E. Shill

It is hereby certified that error appears in the above numbered patent requiring correction and that the said Letters Patent should read as corrected below.

Column 3, line 6, after "from" insert -- one --; line 38, strike out "five-sixteenths of an inch (5/16″ ) wide by"; column 6, line 31, for "materal" read -- material --; column 10, line 46, strike out "indicating", second occurrence; line 71, strike out "bars", second occurrence; column 11, line 4, for "aixs" read -- axis --.

Signed and sealed this 17th day of October 1967.

(SEAL)
Attest:

Edward M. Fletcher, Jr.                   EDWARD J. BRENNER

Attesting Officer                          Commissioner of Patents